United States Patent
Qi

(10) Patent No.: US 11,450,318 B2
(45) Date of Patent: Sep. 20, 2022

(54) SPEECH SKILL CREATING METHOD AND SYSTEM

(71) Applicant: BAIDU ONLINE NETWORK TECHNOLOGY (BEIJING) CO., LTD., Beijing (CN)

(72) Inventor: Yaowen Qi, Beijing (CN)

(73) Assignees: BAIDU ONLINE NETWORK TECHNOLOGY (BEIJING) CO., LTD., Beijing (CN); SHANGHAI XIAODU TECHNOLOGY CO., LTD., Shanghai (CN)

( * ) Notice: Subject to any disclaimer, the term of this patent is extended or adjusted under 35 U.S.C. 154(b) by 363 days.

(21) Appl. No.: 16/711,568

(22) Filed: Dec. 12, 2019

(65) Prior Publication Data

US 2020/0357397 A1 Nov. 12, 2020

(30) Foreign Application Priority Data

May 7, 2019 (CN) .......................... 201910376055.5

(51) Int. Cl.
*G10L 17/22* (2013.01)
*G10L 15/22* (2006.01)
*G06F 8/34* (2018.01)

(52) U.S. Cl.
CPC ................ *G10L 15/22* (2013.01); *G06F 8/34* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 10,102,855 B1* | 10/2018 | Sindhwani | ............ | G06F 40/134 |
| 10,275,671 B1* | 4/2019 | Newman | ................. | G10L 17/22 |
| 10,332,513 B1* | 6/2019 | D'Souza | ............... | G10L 15/183 |

(Continued)

FOREIGN PATENT DOCUMENTS

| | | | |
|---|---|---|---|
| CN | 103874019 A | | 6/2014 |
| CN | 106649825 A | | 5/2017 |

(Continued)

OTHER PUBLICATIONS

LaCharite (https://developer.amazon.com/blogs/post/Tx3DVGG0K0TPUGQ/New-Alexa-Skills-Kit-Template:-Step-by-Step-Guide-to-Build-a-Fact-Skill). (Year: 2016).*

(Continued)

*Primary Examiner* — Seong-Ah A Shin
(74) *Attorney, Agent, or Firm* — Lando & Anastasi, LLP

(57) ABSTRACT

The present disclosure provides a speech skill creating method and system, wherein the method comprises: providing a speech skill creating interface in response to a developer's speech skill creating instruction; obtaining basic information and content configuration of the speech skill through the speech skill creating interface; in response to the developer's online publication instruction, adding a corresponding speech interaction capability for the content of the speech skill, and creating and publishing the speech skill. It is possible to, by employing the solutions of the present disclosure, complete the creation of the speech skill without performing any programming, and improve the development efficiency of the speech skill.

12 Claims, 10 Drawing Sheets

Provide a speech skill creating interface in response to a developer's speech skill creating instruction — S11

Obtain basic information and content configuration of the speech skill through the speech skill creating interface — S12

In response to the developer's online publication instruction, add a corresponding speech interaction capability for the basic information and content configuration of the speech skill, and create and publish the speech skill — S13

(56) References Cited

U.S. PATENT DOCUMENTS

| | | | |
|---|---|---|---|
| 10,409,551 B1* | 9/2019 | Waugh | G10L 15/26 |
| 10,490,195 B1* | 11/2019 | Krishnamoorthy | G10L 17/22 |
| 10,621,984 B2* | 4/2020 | First | G10L 15/22 |
| 10,623,246 B1* | 4/2020 | Iyer | H04L 12/2825 |
| 10,720,157 B1* | 7/2020 | Kapila | G06Q 30/0635 |
| 10,950,231 B1* | 3/2021 | Kockerbeck | G10L 15/26 |
| 10,958,457 B1* | 3/2021 | Davis | H04L 12/2803 |
| 11,295,735 B1* | 4/2022 | Anuar | H04L 67/53 |
| 2002/0152070 A1* | 10/2002 | Oda | H04M 1/66 |
| | | | 704/E17.015 |
| 2006/0136870 A1 | 6/2006 | Wilson et al. | |
| 2012/0240146 A1 | 9/2012 | Rao | |
| 2018/0068103 A1* | 3/2018 | Pitkänen | G06Q 20/40145 |
| 2019/0036856 A1* | 1/2019 | Bergenlid | G10L 15/22 |
| 2019/0108840 A1* | 4/2019 | Sharifi | G10L 15/30 |
| 2019/0272831 A1* | 9/2019 | Kajarekar | G10L 15/22 |
| 2019/0306314 A1* | 10/2019 | Segalis | G06F 40/56 |
| 2020/0134147 A1* | 4/2020 | Van Den Hoven | G06F 3/16 |

FOREIGN PATENT DOCUMENTS

| | | |
|---|---|---|
| CN | 106961385 A | 7/2017 |
| CN | 108491188 A | 9/2018 |
| CN | 108564946 A | 9/2018 |
| CN | 108984157 A | 12/2018 |
| CN | 109358856 A | 2/2019 |
| EP | 3057091 A1 | 8/2016 |
| KR | 20010016364 A | 3/2001 |
| WO | 2018217014 A1 | 11/2018 |

OTHER PUBLICATIONS

"Research on Intelligent Voice Service Design of Family Digital Entertainment Systerm," Aug. 15, 2018. [English Abstract translation only].

Chinese Notice of Allowance from corresponding Chinese Application No. 201910376055.5 dated Jan. 6, 2022.

Ichikawa Pure, "Alexa Skill Production," Feb. 20, 2018.

Kabushiki Kaisha, "the first of the Alexa skill, Technical Knowledge," Jun. 8, 2018.

"Alexa", Amazon Developer Instructions, Jun. 8, 2018, pp. 73-115 (Reference #1 in Japanese Reasons for Refusal).

Chinese First Office Action from corresponding Chinese Application 201910376055.5 dated Jan. 27, 2021.

Chinese Search Report from corresponding Chinese Application No. 201903760555 dated Jan. 18, 2021.

Japanese Notice of Reasons for Refusal from corresponding Japanese Patent Application No. 2019-223396 dated Jan. 26, 2021.

Ichikawa "Alexa", Amazon Developer Instructions, Feb. 20, 2018, pp. 16-80 (Reference #2 in the Japanese Reasons for Refusal).

* cited by examiner

SPEECH SKILL CREATING METHOD AND SYSTEM

The present application claims the priority of Chinese Patent Application No. 201910376055.5, filed on May 7, 2019, with the title of "Speech skill creating method and system". The disclosure of the above applications is incorporated herein by reference in its entirety.

FIELD OF THE DISCLOSURE

The present disclosure relates to computer disclosure technologies, and particularly to a speech skill creating method and system.

BACKGROUND OF THE DISCLOSURE

As artificial intelligence develops rapidly, companies perform in-depth research into artificial intelligence speech direction, and gradually advance respective speech dialogue platforms. Developers may publish skills to the speech dialog platforms according to their own needs and creatives for invocation.

A skill is similar to an application, and completes one or more specific functions through speech dialog. The skill is directly comprised of one or more intents. In multiple rounds of dialogues, it is possible to distinguish ideas by contextual intents with explicit intents, and thereby enter a corresponding intent. For example, an audio speech skill may realize the control of audio through the speech; a image speech skill may realize the control of the image through the speech; a conversation speech skill may realize the control of conversations.

In the prior art, upon publishing skills in the dialog platform, the developers need to perform relevant creation through a code layer. This requires the developers to master a substantial programming capability to complete skill creation, and raises the threshold for publishing skills.

SUMMARY OF THE DISCLOSURE

A plurality of aspects of the present disclosure provide a speech skill creating method, system, apparatus and storage medium, which may complete speech skill creation without programming, and improve the development efficiency of the speech skill.

According to an aspect of the present disclosure, there is provided a speech skill creating method, comprising:

providing a speech skill creating interface in response to a developer's speech skill creating instruction;

obtaining basic information and content configuration of the speech skill through the speech skill creating interface;

in response to the developer's online publication instruction, adding a corresponding speech interaction capability for the basic information and content configuration of the speech skill, and creating and publishing the speech skill.

The above aspect and any possible implementation mode further provide an implementation mode: the speech skill creating interface comprises:

a basic information page configured to obtain the basic information of the speech skill;

a content management page configured to obtain the content configuration of the speech skill;

an online publication page configured to obtain an online publication instruction of the publisher.

The above aspect and any possible implementation mode further provide an implementation mode: the providing a speech skill creating interface in response to a developer's speech skill creating instruction comprises:

providing a speech skill type selection interface in response to the developer's speech skill creating instruction;

in response to the speech skill type selected by the developer, providing a speech skill creating interface of the speech skill type.

The above aspect and any possible implementation mode further provide an implementation mode: the skill type includes any one of the following: conversation speech skill, image speech skill and audio speech skill.

The above aspect and any possible implementation mode further provide an implementation mode: the basic information of the speech skill includes:

a skill name, a call name and skill payment information.

The above aspect and any possible implementation mode further provide an implementation mode: the content configuration of the speech skill includes:

conversation content and play mode of the conversation speech skill; or, image content and play mode of the image speech skill; or, audio content and play mode of the audio speech skill.

The above aspect and any possible implementation mode further provide an implementation mode: the adding a corresponding speech interaction capability for the basic information and content configuration of the speech skill comprises:

according to the obtained basic information and content configuration of the speech skill, adding a basic intent, monitoring activation and deactivation, exit of the skill, and online presentation capability to the conversation speech skill; or, adding a basic intent, a search intent, automatic play, a skill exit capability and an online presentation capability to the image speech skill; or, adding a basic intent, a search intent, automatic play, exit of the skill and an online presentation capability to the audio speech skill.

According to another aspect of the present disclosure, there is provided a speech skill creating system, comprising:

a speech skill creating interface providing module configured to provide a speech skill creating interface in response to a developer's speech skill creating instruction;

a speech skill configuring module configured to obtain basic information and content configuration of the speech skill through the speech skill creating interface;

a skill creating and publishing module configured to, in response to the developer's online publication instruction, add a corresponding speech interaction capability for the basic information and content configuration of the speech skill, and create and publish the speech skill.

The above aspect and any possible implementation mode further provide an implementation mode: the speech skill creating interface comprises:

a basic information page configured to obtain the basic information of the speech skill;

a content management page configured to obtain the content configuration of the speech skill;

an online publication page configured to obtain an online publication instruction of the publisher.

The above aspect and any possible implementation mode further provide an implementation mode: the speech skill creating interface providing module is specifically configured to:

provide a speech skill type selection interface in response to the developer's speech skill creating instruction;

in response to the speech skill type selected by the developer, provide a speech skill creating interface of the speech skill type.

The above aspect and any possible implementation mode further provide an implementation mode: the skill type includes any one of the following: conversation speech skill, image speech skill and audio speech skill.

The above aspect and any possible implementation mode further provide an implementation mode: the basic information of the speech skill includes:

a skill name, a call name and skill payment information.

The above aspect and any possible implementation mode further provide an implementation mode: the content configuration of the speech skill includes:

conversation content and play mode of the conversation speech skill; or, image content and play mode of the image speech skill; or, audio content and play mode of the audio speech skill.

The above aspect and any possible implementation mode further provide an implementation mode: the speech skill creating and publishing module is specifically configured to:

according to the obtained basic information and content configuration of the speech skill, add a basic intent, monitoring activation and deactivation, exit of the skill, and online presentation capability to the conversation speech skill; or, add a basic intent, a search intent, automatic play, a skill exit capability and an online presentation capability to the image speech skill; or, add a basic intent, a search intent, automatic play, exit of the skill and an online presentation capability to the audio speech skill.

According to a further aspect of the present disclosure, there is provided a computer device, comprising a memory, a processor and a computer program which is stored on the memory and runnable on the processor, the processor, upon executing the program, implementing the above-mentioned method.

According to a further aspect of the present disclosure, there is provided a computer-readable storage medium on which a computer program is stored, the program, when executed by the processor, implementing the aforesaid method.

As can be seen from the above introduction, it is possible to, by employing the solutions of the present disclosure, complete the creation of the speech skill without performing any programming, and improve the development efficiency of the speech skill.

BRIEF DESCRIPTION OF DRAWINGS

FIG. 6 is a schematic diagram of a basic information page of an audio speech skill according to the present disclosure;

FIG. 7 is a schematic diagram of a content management page of the conversation speech skill according to the present disclosure;

FIG. 8 is a schematic diagram of a content management page of the image speech skill according to the present disclosure;

FIG. 9 is a schematic diagram of a content management page of the audio speech skill according to the present disclosure;

FIG. 11 is a schematic diagram of an online publication page of the image speech skill according to the present disclosure;

FIG. 12 is a schematic diagram of an online publication page of the audio speech skill according to the present disclosure.

DETAILED DESCRIPTION OF PREFERRED EMBODIMENTS

The technical solutions in embodiments of the present disclosure will be clearly and completely described below with reference to figures in embodiments of the present disclosure to make objectives, technical solutions and advantages of embodiments of the present disclosure more apparent. Obviously, embodiments described here are partial embodiments of the present disclosure not all embodiments. All other embodiments obtained by those having ordinary skill in the art based on the embodiments in the present disclosure without making any inventive efforts all belong to the protection scope of the present disclosure.

Figure 1:
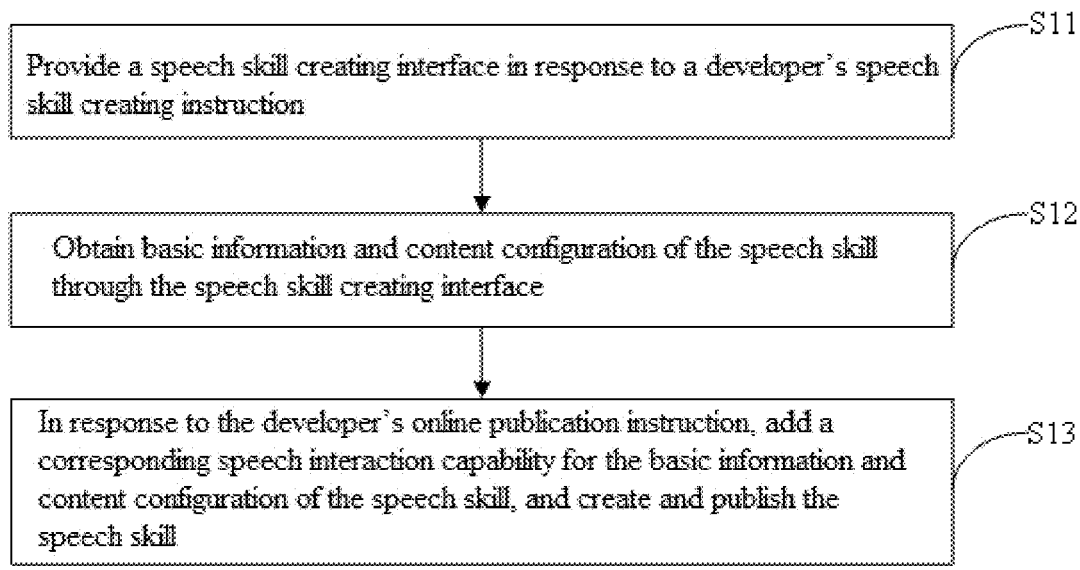
FIG. 1 is a flow chart of a speech skill creating method according to the present disclosure.

FIG. 1 is a flow chart of a speech skill creating method according to the present disclosure. As shown in FIG. 1, the method comprises the following steps:

Step S11: providing a speech skill creating interface in response to a developer's speech skill creating instruction;

Step S12: obtaining basic information and content configuration of the speech skill through the speech skill creating interface;

Step S13: in response to the developer's online publication instruction, adding a corresponding speech interaction capability for the basic information and content configuration of the speech skill, and creating and publishing the speech skill.

A subject for performing the method is a speech skill development platform.

In a preferred implementation mode of step S11, in response to the developer's speech skill creation instruction, for example, in response to an operation of a skill creation button on the displayed main interface after the developer logs in the speech skill development platform, the speech skill development platform provides the developer with a speech skill creation interface.

Preferably, in the present embodiment, the speech skill takes the conversation speech skill, image speech skill and audio speech skill as examples, and includes but is not limited to the above speech skills. Since the conversation speech skill, image speech skill and audio speech skill are different, speech skill templates provided for the above speech skills are different, and therefore it is necessary to provide different speech skill creating interfaces to different skills.

Preferably, in response to the developer's speech skill creation instruction, for example, in response to an operation of a skill creation button on the displayed main interface after the developer logs in the speech skill development platform, the speech skill development platform provides the developer with a speech skill type selection interface to obtain different speech skill templates. In response to the speech skill type selected by the developer, the speech skill development platform provides the speech skill creation interface of the speech skill type.

In a preferred implementation mode of step S12, obtaining basic information and content configuration of the speech skill through the speech skill creating interface;

preferably, the speech skill creating interface includes: a basic information page configured to obtain the basic information of the speech skill; a content management page configured to obtain the content configuration of the speech skill; an online publication page configured to obtain an online publication instruction of the publisher.

Preferably, the speech skill creating interface may further include other relevant pages, for example, a test verification page, a resource management page, an SSML transcoding page, a support page, a document center page, a common question and answer page, a feedback submission page, a technical classroom page, etc., which may be flexibly set according to needs.

Figure 4:
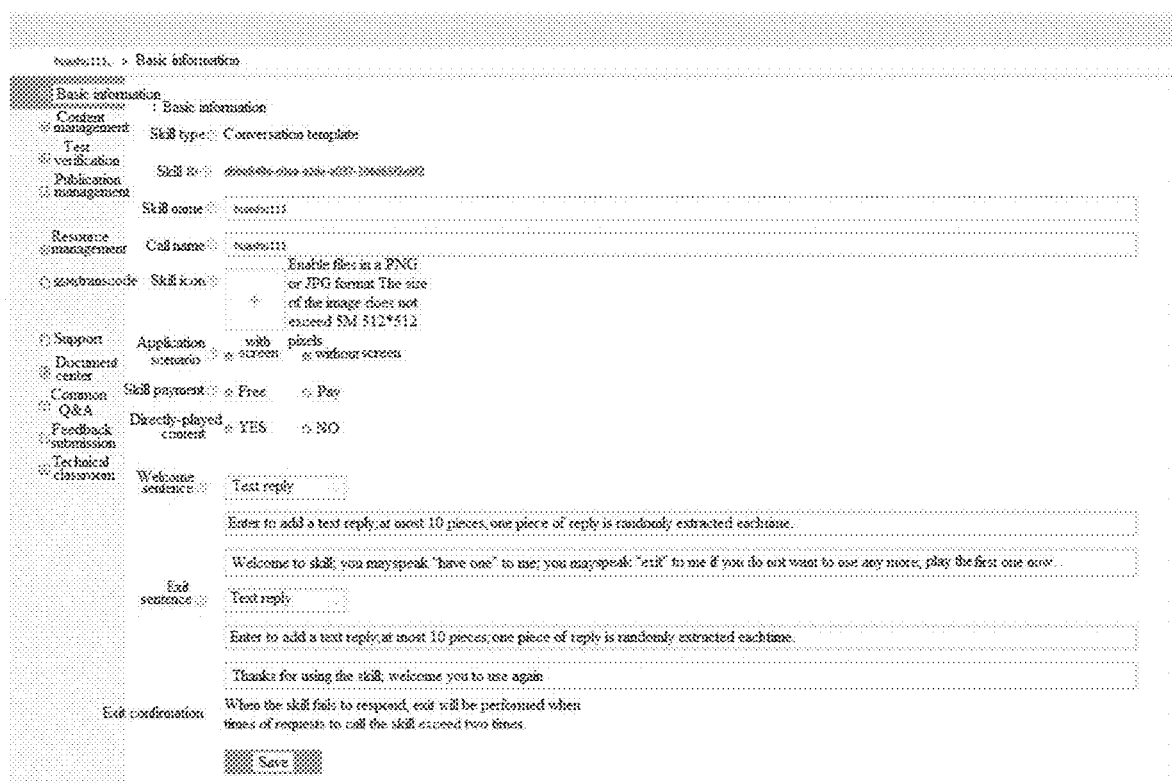
FIG. 4 is a schematic diagram of a basic information page of a conversation speech skill according to the present disclosure.
Figure 5:
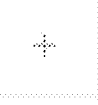
FIG. 5 is a schematic diagram of a basic information page of a image speech skill according to the present disclosure.
Figure 6:
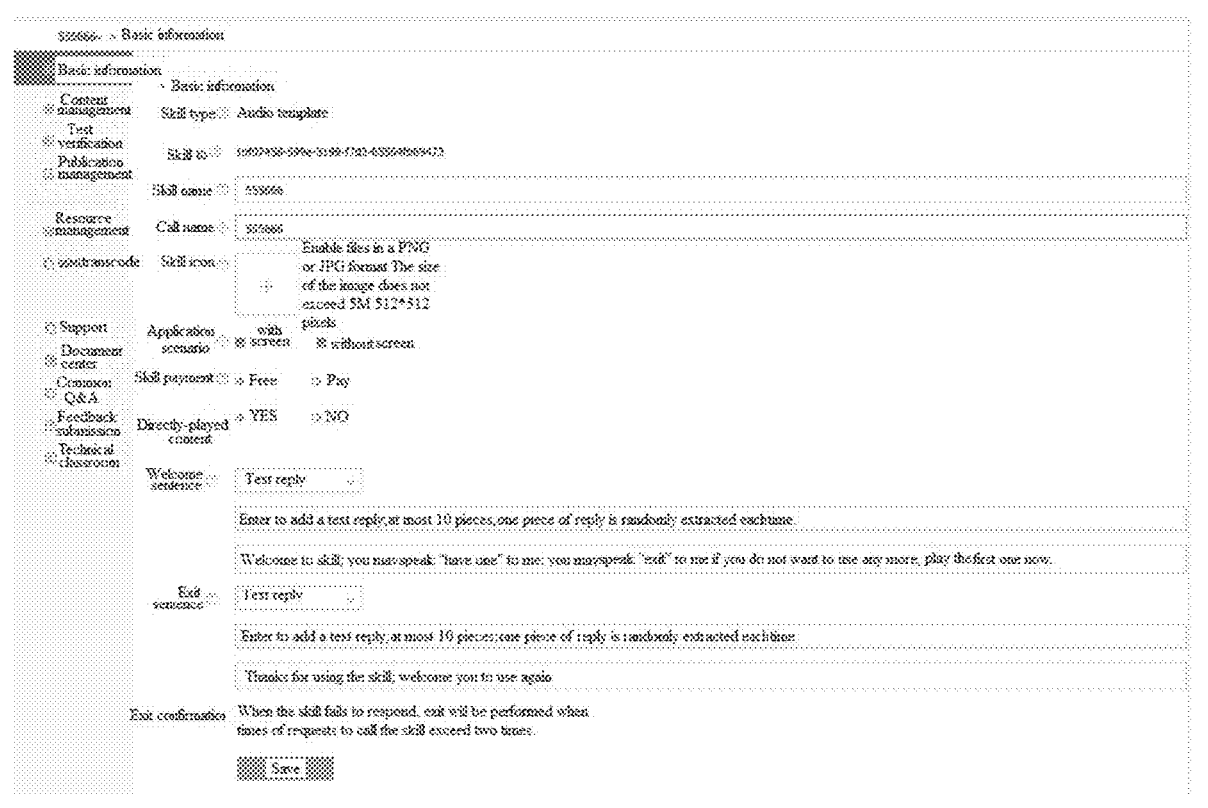

Preferably, the basic information page, as shown in FIG. 4, FIG. 5 and FIG. 6, is used to acquire basic information of the speech skill. The basic information of the speech skill at least includes: a skill name, a call name and skill payment information.

The skill name information is a skill name input by the developer from a skill name input box of the basic information page; the call name information is a call name input by the developer from a call name input box of the basic information page; the skill payment information is a pay option or a free option selected by the developer from a skill payment check box on the basic information page.

Preferably, as for the conversation speech skill and the audio speech skill, the basic information of the speech skill further includes an application scenario, for example whether the conversation speech skill can be applied to a scenario with a screen or without a screen. The image speech skill defaults to a scenario with a screen, so it is unnecessary to provide an application scenario option in the basic information page.

Preferably, the basic information of the speech skill may further include: an option for directly playing content, welcome sentence, exit sentence, exit confirmation information and so on.

The basic information page may further display a skill type and a skill ID of the speech skill; the skill type is a skill type selected by the developer in a speech skill type selection interface; and the skill ID is ID generated by the skill development platform for the speech skill.

Preferably, the content management page is configured to obtain a content configuration of the speech skill.

Figure 7:
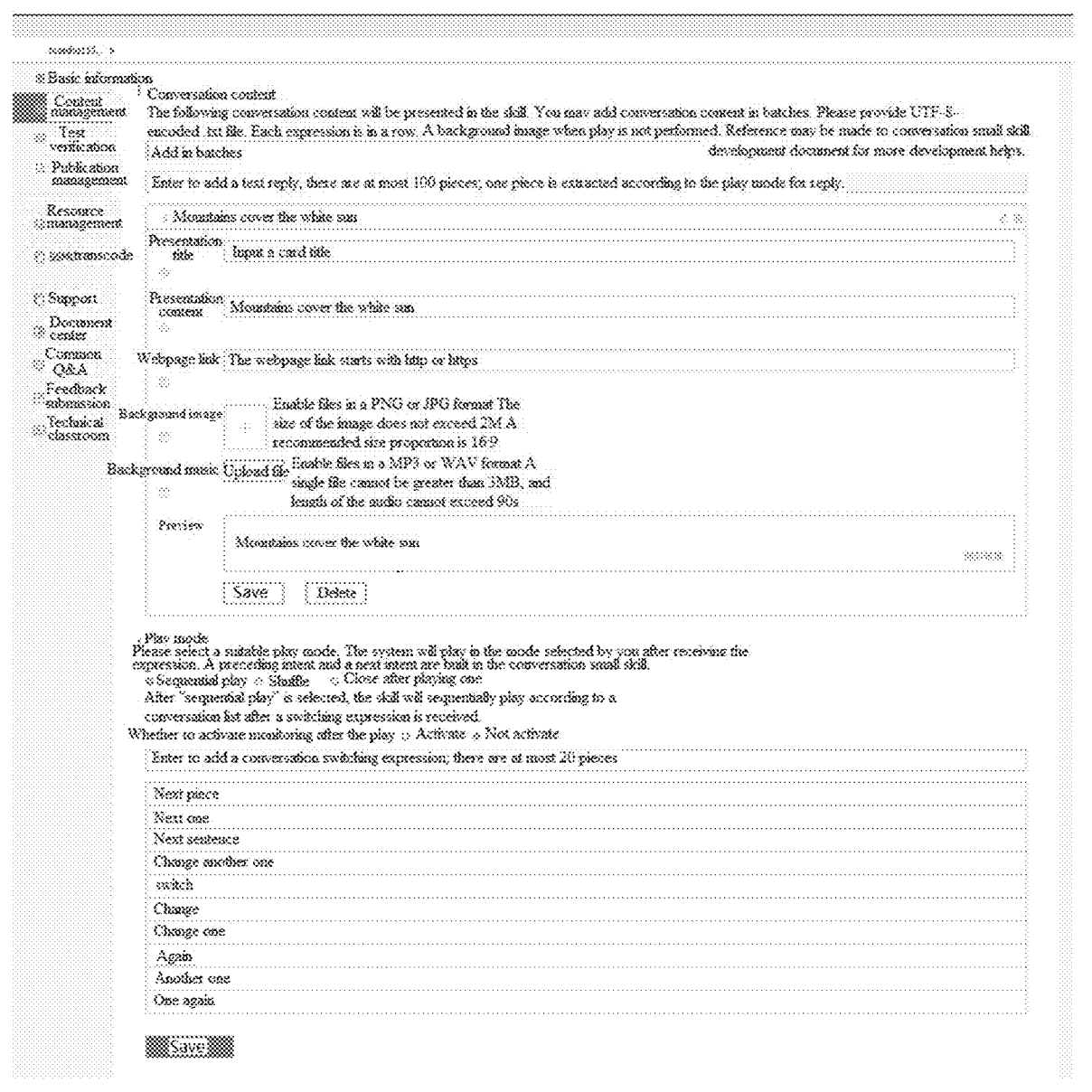

Preferably, as for the conversation speech skill, the content configuration of the conversation speech skill includes conversation content and a play mode of the conversation speech skill, as shown in FIG. 7.

The conversation content includes options such as a presentation title, presentation content, a webpage link, a background image, background music, and preview; the foregoing conversation content will be presented in the skill.

The developer may add the conversation content on the content management page. The developer may also add the conversation content in batches, add a background image, a webpage link and background music to the conversation, and generate a preview of the presentation.

The play mode includes options such as sequential play, shuffle play, and closing after playing one, and the system will play in the play mode selected by the developer. The play mode further includes an option of whether to enable monitoring after play. The play mode further includes a conversation-switching expression such as a preceding intent and a next intent so that the developer adds the conversation-switching expression.

The developer may control the play mode of the conversation, and may set sequential play or shuffle play of the conversations. The developer may set closing after playing. Setting closing after playing means that the skill exits after the play of the conversation content is completed. The developer may control whether the microphone is turned on after the play of one piece of conversation is completed. The developer may configure content for switching the conversations. When the developer expresses these content, the conversation content is switched.

Figures 8, 9:
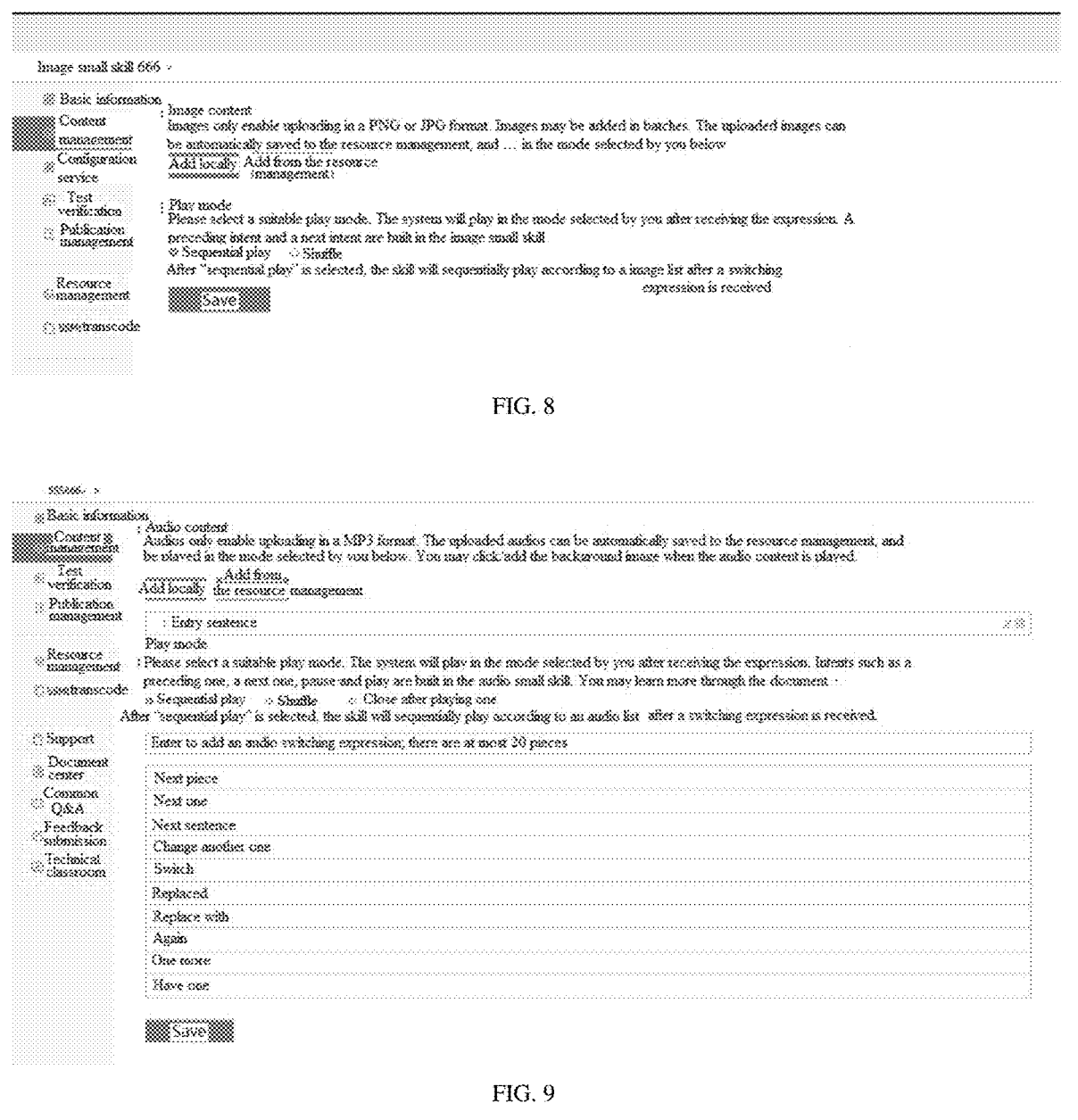

Preferably, as for the image speech skill, the content configuration of the image speech skill includes image content and play mode of the conversation speech skill, as shown in FIG. 8.

The image content includes a button for adding image content locally and a button for adding image content from resource management. The uploaded images will be automatically saved in the resource management and played in the play mode selected by the developer.

The play mode includes options such as sequential play and shuffle play. The system will play in the play mode selected by the developer. The play mode further includes a conversation-switching expression such as a preceding intent and a next intent so that the developer adds the conversation-switching expression.

The developer may perform addition of the image content at the content management page. The added content is divided into two parts: one is added locally, and the other is added from the resource management. The play mode may be selected after addition. The play mode is sequential play and shuffle play.

Preferably, as for the audio speech skill, the content configuration of the audio speech skill includes audio content and play mode of the audio speech skill, as shown in FIG. 9.

The audio content includes a button for adding audio content locally and a button for adding audio content from resource management. The uploaded audio will be automatically saved in the resource management and played in the play mode selected by the developer.

The play mode includes options such as sequential play, shuffle play, and closing after playing one. The system will play in the play mode selected by the developer. The play mode further includes a conversation-switching expression such as a preceding intent and a next intent so that the developer adds the conversation-switching expression.

The developer may perform addition of the audio content at the content management page. The added audio content is divided into two parts: one is added locally, and the other is added from the resource management. The play mode may be selected after the addition. The play mode is sequential play and shuffle play. The developer may edit a name of the audio. The editing may affect the display of the audio on the interface.

Preferably, the online publication page is used to obtain an online publication instruction of the publisher.

Preferably, the developer completes the basic information of the speech skill at the basic information page, and may jump to the online publication page after the content configuration of the speck skill is completed at the content management page.

Figure 10:
FIG. 10 is a schematic diagram of an online publication page of the conversation speech skill according to the present disclosure.
Figure 11:
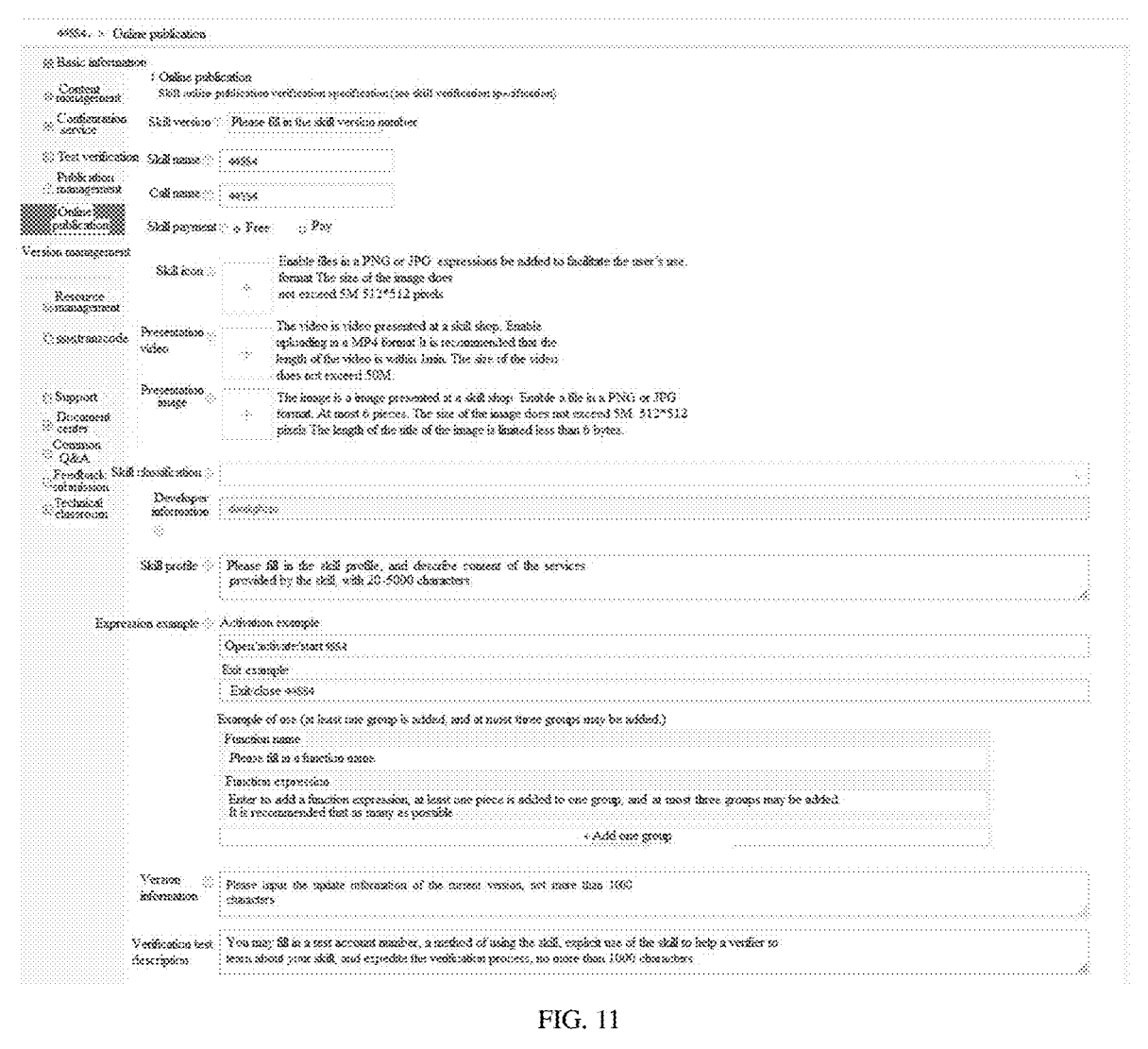
Figure 12:
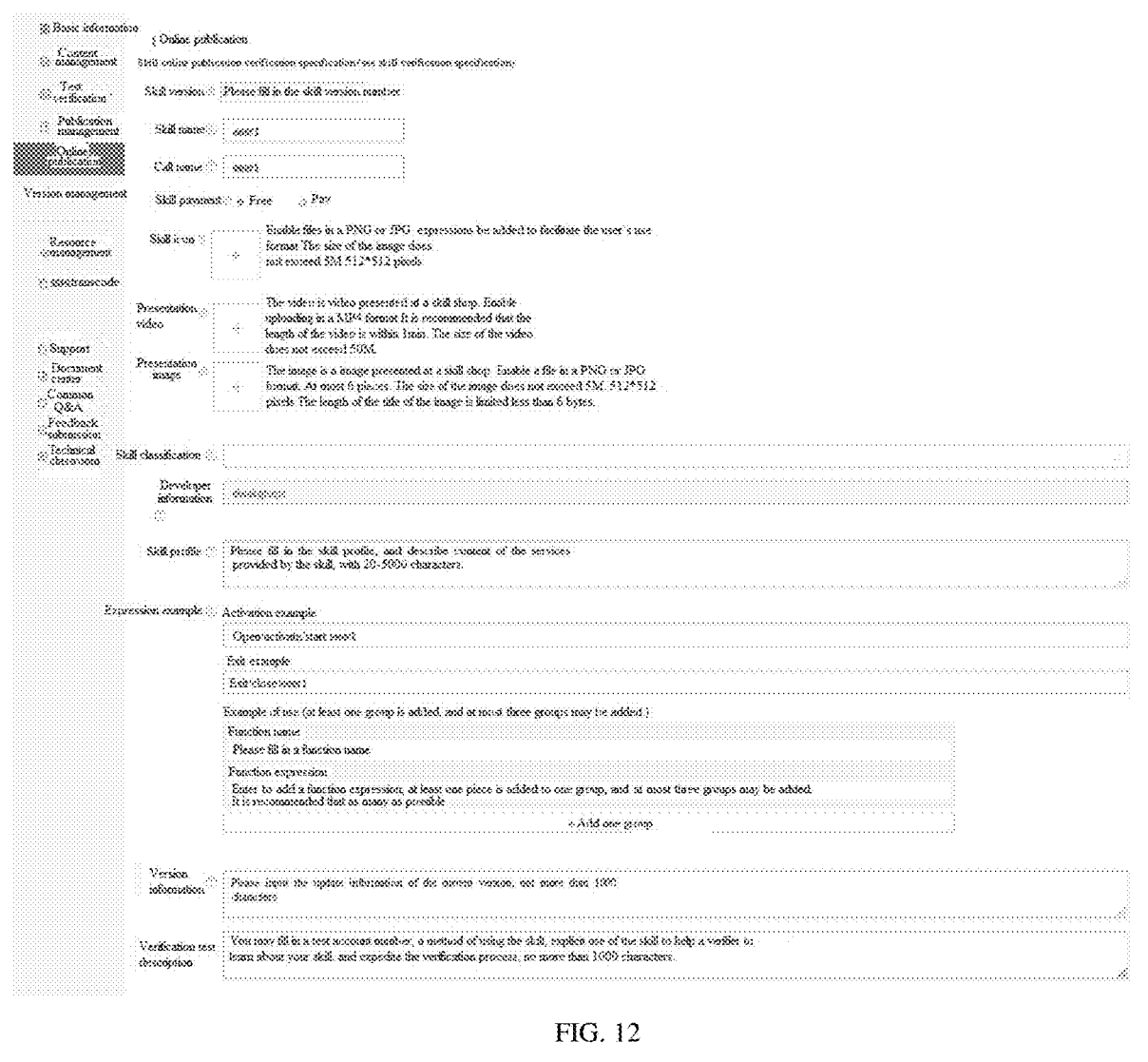

The online publication page is used to obtain the following information filled in or selected by the developer: skill version, skill name, call name, application scenario, skill charges, skill icon, presentation video, presentation image, skill classification, developer information, skill profile, expression example, version information, and verification and test description, as shown in FIG. 10, FIG. 11 and FIG. 12.

In a preferred implementation mode of step S13, in response to the developer's online publication instruction, adding a corresponding speech interaction capability for the basic information and content configuration of the speech skill, and creating and publishing the speck skill.

Preferably, after completing information related to the speech skill at the online publication page, the developer may send an online publication instruction, for example, send the online instruction to the speech skill development platform by clicking a button for applying to get online on the online publication page.

Preferably, the conversation speech skill is taken as an example. Adding the corresponding speech interaction capability for the basic information and content configuration of the speech skill includes: adding a basic intent, monitoring activation and deactivation, exit of the skill, and online presentation capability to the conversation speech skill, according to the content configuration of the obtained conversation speech skill.

The basic intent is switching intents. After the user speaks out a corresponding expression, the conversations will be switched.

The monitoring activation and deactivation means that after the user finishes configuring activation of the monitoring, the microphone is automatically turned on to receive the user's voice after the play of one piece of content is completed.

The exit of the skill means that the skill exits when the user expresses "exit".

The presentation after getting online means adding a background image for the conversation skill for presentation.

Preferably, the image speech skill is taken as an example. Adding the corresponding speech interaction capability for the basic information and content configuration of the speech skill includes: adding a basic intent, a search intent, automatic play, a skill exit capability and an online presentation capability to the content of the image speech skill, according to the content configuration of the obtained image speech skill.

The basic intent includes a preceding one and next one. When the user says "preceding one" or "next one", images are switched automatically.

The search intent includes image search intent and name search intent;

The image search intent means recognizing images unloaded by the user, and recognizing tags of the images, and enabling the machine to return a corresponding image after the user speaks out a relevant key word.

The name search intent means recognizing images designated by the user, and enabling the machine to return a corresponding image to match the user's demand when the name spoken out by the user is similar to the name of the image.

Automatic play of the susohu image means switching images within a certain time period, performing a new traversal upon completion of the traversal of the images through sequential play, playing the images all the time through shuffle play.

The exit of the skill means that the skill exits when the user expresses "exit".

The online presentation means automated blurred background of the images. If a image scale is not well matched to the screen, self-adaptation of the image is performed, and Gaussian blur is added behind to enhance the display experience.

Preferably, the audio speech skill is taken as an example. Adding the corresponding speech interaction capability for the basic information and content configuration of the speech skill includes: adding a basic intent, a search intent, automatic play, exit of the skill and an online presentation capability to the content of the audio speech skill, according to the content configuration of the obtained audio speech skill.

Wherein

The basic intent includes preceding one, next one, pause and continue. When the user says "preceding one" or "next one", audio content is switched automatically. When the user says "pause" or "continues", the play of the audio may be controlled.

The search intent is audio name search intent. The audio designated by the user may be recognized. The machine returns a corresponding audio to match the user's demand when the name spoken out by the user is similar to the video name.

The automatic play intent is that after finishing playing an audio, the machine plays the next audio in the mode of sequential play or shuffle.

The exit of the skill means that the skill exits when the user expresses "exit".

The presentation after getting online means adding a background image for the conversation skill for presentation.

According to the solution of the present disclosure, the creation of the speech skill may be completed without performing any programming; the user only needs to edit relevant information on the basic information page, content management page and online publication page in the speech skill creating interface in turn, the speech skill development platform performs processing for the user-edited content, fills in a relevant capability, and automatically generates the speech skill and puts the speech skill online. The developer may complete the generation of the speech skill without performing any programming, and improves the development efficiency of the speech skill.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above introduces the method embodiment. The solution of the present disclosure will be further described through an apparatus embodiment.

Figure 2:
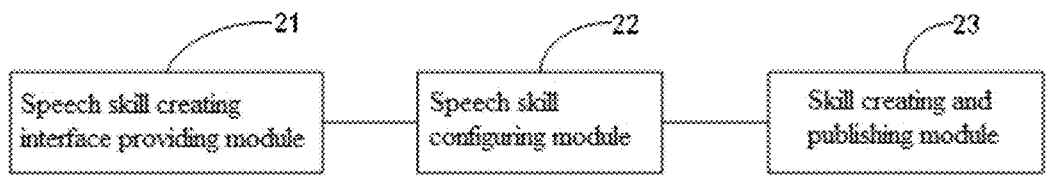
FIG. 2 is a structural diagram of a speech skill creating system according to the present disclosure.

FIG. 2 is a structural diagram of the audio skill creating system according to the present disclosure. As shown in FIG. 2, the system comprises:

a speech skill creating interface providing module 21 configured to provide a speech skill creating interface in response to a developer's speech skill creating instruction;

a speech skill configuring module 22 configured to obtain basic information and content configuration of the speech skill through the speech skill creating interface;

a skill creating and publishing module 23 configured to, in response to the developer's online publication instruction, add a corresponding speech interaction capability for the content of the speech skill, and create and publish the speech skill.

A subject for performing the method is a speech skill development platform.

In a preferred implementation mode of the speech skill creating interface providing module 21, in response to the developer's speech skill creation instruction, for example, in response to an operation of a skill creation button on the displayed main interface after the developer logs in the speech skill development platform, the speech skill development platform provides the developer with a speech skill creation interface.

Preferably, in the present embodiment, the speech skill takes the conversation speech skill, image speech skill and audio speech skill as examples, and includes but is not limited to the above speech skills. Since the conversation speech skill, image speech skill and audio speech skill are different, speech skill templates provided for the above speech skills are different, and therefore it is necessary to provide different speech skill creating interfaces to different skills.

Preferably, in response to the developer's speech skill creation instruction, for example, in response to an operation of a skill creation button on the displayed main interface after the developer logs in the speech skill development platform, the speech skill development platform provides the developer with a speech skill type selection interface to obtain different speech skill templates. In response to the speech skill type selected by the developer, the speech skill development platform provides the speech skill creation interface of the speech skill type.

In a preferred implementation mode of the speech skill configuring module 22, the speech skill configuring module 22 is configured to obtain basic information and content configuration of the speech skill through the speech skill creating interface;

preferably, the speech skill creating interface includes: a basic information page configured to obtain the basic information of the speech skill; a content management page configured to obtain the content configuration of the speech skill; an online publication page configured to obtain an online publication instruction of the publisher.

Preferably, the speech skill creating interface may further include other relevant pages, for example, a test verification page, a resource management page, an SSML transcoding page, a support page, a document center page, a common question and answer page, a feedback submission page, a technical classroom page, etc., which may be flexibly set according to needs.

Preferably, the basic information page, as shown in FIG. 4, FIG. 5 and FIG. 6, is used to acquire basic information of the speech skill. The basic information of the speech skill at least includes: a skill name, a call name and skill payment information.

The skill name information is a skill name input by the developer from a skill name input box of the basic information page; the call name information is a call name input by the developer from a call name input box of the basic information page; the skill payment information is a pay option or a free option selected by the developer from a skill payment check box on the basic information page.

Preferably, as for the conversation speech skill and the audio speech skill, the basic information of the speech skill further includes an application scenario, for example whether the conversation speech skill can be applied to a scenario with a screen or without a screen. The image speech skill defaults to a scenario with a screen, so it is unnecessary to provide an application scenario option in the basic information page.

Preferably, the basic information of the speech skill may further include: an option for directly playing content, welcome sentence, exit sentence, exit confirmation information and so on.

The basic information page may further display a skill type and a skill ID of the speech skill; the skill type is a skill type selected by the developer in a speech skill type selection interface; and the skill ID is ID generated by the skill development platform for the speech skill.

Preferably, the content management page is configured to obtain a content configuration of the speech skill.

Preferably, as for the conversation speech skill, the content configuration of the conversation speech skill includes conversation content and a play mode of the conversation speech skill, as shown in FIG. 7.

The conversation content includes options such as a presentation title, presentation content, a webpage link, a background image, background music, and preview; the foregoing conversation content will be presented in the skill.

The developer may add the conversation content on the content management page. The developer may also add the conversation content in batches, add a background image, a webpage link and background music to the conversation, and generate a preview of the presentation.

The play mode includes options such as sequential play, shuffle plays, and closing after playing one, and the system will play in the play mode selected by the developer. The play mode further includes an option of whether to enable monitoring after play. The play mode further includes a conversation-switching expression such as a preceding intent and a next intent so that the developer adds the conversation-switching expression.

The developer may control the play mode of the conversation, and may set sequential play or shuffle play of the conversations. The developer may set closing after playing. Setting closing after playing means that the skill exits after the play of the conversation content is completed. The developer may control whether the microphone is turned on after the play of one piece of conversation is completed. The developer may configure content for switching the conversations. When the developer expresses these content, the conversation content will be switched.

Preferably, as for the image speech skill, the content configuration of the image speech skill includes image content and play mode of the conversation speech skill, as shown in FIG. 8.

The image content includes a button for adding image content locally and a button for adding image content from resource management. The uploaded images will be automatically saved in the resource management and played in the play mode selected by the developer.

The play mode includes options such as sequential play and shuffle play. The system will play in the play mode selected by the developer. The play mode further includes a conversation-switching expression such as a preceding intent and a next intent so that the developer adds the conversation-switching expression.

The developer may perform addition of the image content at the content management page. The added content is divided into two parts: one is added locally, and the other is added from the resource management. The play mode may be selected after addition. The play mode is sequential play and shuffle play.

Preferably, as for the audio speech skill, the content configuration of the audio speech skill includes audio content and play mode of the audio speech skill, as shown in FIG. 9.

The audio content includes a button for adding audio content locally and a button for adding audio content from resource management. The uploaded audio will be automatically saved in the resource management and played in the play mode selected by the developer.

The play mode includes options such as sequential play, shuffle play, and closing after playing one. The system will play in the play mode selected by the developer. The play mode further includes a conversation-switching expression such as a preceding intent and a next intent so that the developer adds the conversation-switching expression.

The developer may perform addition of the audio content at the content management page. The added audio content is divided into two parts: one is added locally, and the other is added from the resource management. The play mode may be selected after the addition. The play mode is sequential play and shuffle play. The developer may edit a name of the audio. The editing may affect the display of the audio on the interface.

Preferably, the online publication page is used to obtain an online publication instruction of the publisher.

Preferably, the developer completes the basic information of the speech skill at the basic information page, and may jump to the online publication page after the content configuration of the speck skill is completed at the content management page.

The online publication page is used to obtain the following information filled in or selected by the developer: skill version, skill name, call name, application scenario, skill charges, skill icon, presentation video, presentation image, skill classification, developer information, skill profile, expression example, version information, and verification and test description, as shown in FIG. 10, FIG. 11 and FIG. 12.

In a preferred implementation mode of the skill creating and publishing module 23, in response to the developer's online publication instruction, the skill creating and publishing module 23 adds a corresponding speech interaction capability for the basic information and content configuration of the speech skill, and create and publish the speck skill.

Preferably, after completing information related to the speech skill at the online publication page, the developer may send an online publication instruction, for example, send the online instruction to the speech skill development platform by clicking a button for applying to get online on the online publication page.

Preferably, the conversation speech skill is taken as an example. Adding the corresponding speech interaction capability for the basic information and content configuration of the speech skill includes: adding a basic intent, monitoring activation and deactivation, exit of the skill, and online presentation capability to the conversation speech skill, according to the content configuration of the obtained conversation speech skill.

The basic intent is switching intents. After the user speaks out a corresponding expression, the conversations will be switched.

The monitoring activation and deactivation means that after the user finishes configuring activation of the monitoring, the microphone is automatically turned on to receive the user's voice after the play of one piece of content is completed.

The exit of the skill means that the skill exits when the user expresses "exit".

The presentation after getting online means adding a background image for the conversation skill for presentation.

Preferably, the image speech skill is taken as an example. Adding the corresponding speech interaction capability for the basic information and content configuration of the speech skill includes: adding a basic intent, a search intent, automatic play, a skill exit capability and an online presentation capability to the content of the image speech skill, according to the content configuration of the obtained image speech skill.

The basic intent includes a preceding one and next one. When the user says "preceding one" or "next one", images are switched automatically.

The search intent includes image search intent and name search intent;

The image search intent means recognizing images unloaded by the user, and recognizing tags of the images, and enabling the machine to return a corresponding image after the user speaks out a relevant key word.

The name search intent means recognizing images designated by the user, and enabling the machine to return a corresponding image to match the user's demand when the name spoken out by the user is similar to the name of the image.

Automatic play of the susohu image means switching images within a certain time period, performing a new traversal upon completion of the traversal of the images through sequential play, playing the images all the time through shuffle play.

The exit of the skill means that the skill exits when the user expresses "exit".

The online presentation means automated blurred background of the images. If a image scale is not well matched to the screen, self-adaptation of the image is performed, and Gaussian blur is added behind to enhance the display experience.

Preferably, the audio speech skill is taken as an example. Adding the corresponding speech interaction capability for the basic information and content configuration of the speech skill includes: adding a basic intent, a search intent, automatic play, exit of the skill and an online presentation capability to the content of the audio speech skill, according to the content configuration of the obtained audio speech skill.

Wherein

The basic intent includes preceding one, next one, pause and continue. When the user says "preceding one" or "next one", audio content is switched automatically. When the user says "pause" or "continues", the play of the audio may be controlled.

The search intent is audio name search intent. The audio designated by the user may be recognized. The machine returns a corresponding audio to match the user's demand when the name spoken out by the user is similar to the video name.

The automatic play intent is that after finishing playing an audio, the machine plays the next audio in the mode of sequential play or shuffle.

The exit of the skill means that the skill exits when the user expresses "exit".

The presentation after getting online means adding a background image for the conversation skill for presentation.

According to the solution of the present disclosure, the creation of the speech skill may be completed without performing any programming; the user only needs to edit relevant information on the basic information page, content management page and online publication page in the speech skill creating interface in turn, the speech skill development platform performs processing for the user-edited content, fills in a relevant capability, and automatically generates the speech skill and puts the speech skill online. The developer may complete the generation of the speech skill without performing any programming, and improves the development efficiency of the speech skill.

Those skilled in the art may clearly understand that reference may be made to the corresponding process in the above method embodiment for the specific operating process of the described terminal and server, which will not be detailed any more here for the sake of ease and brevity of depictions.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
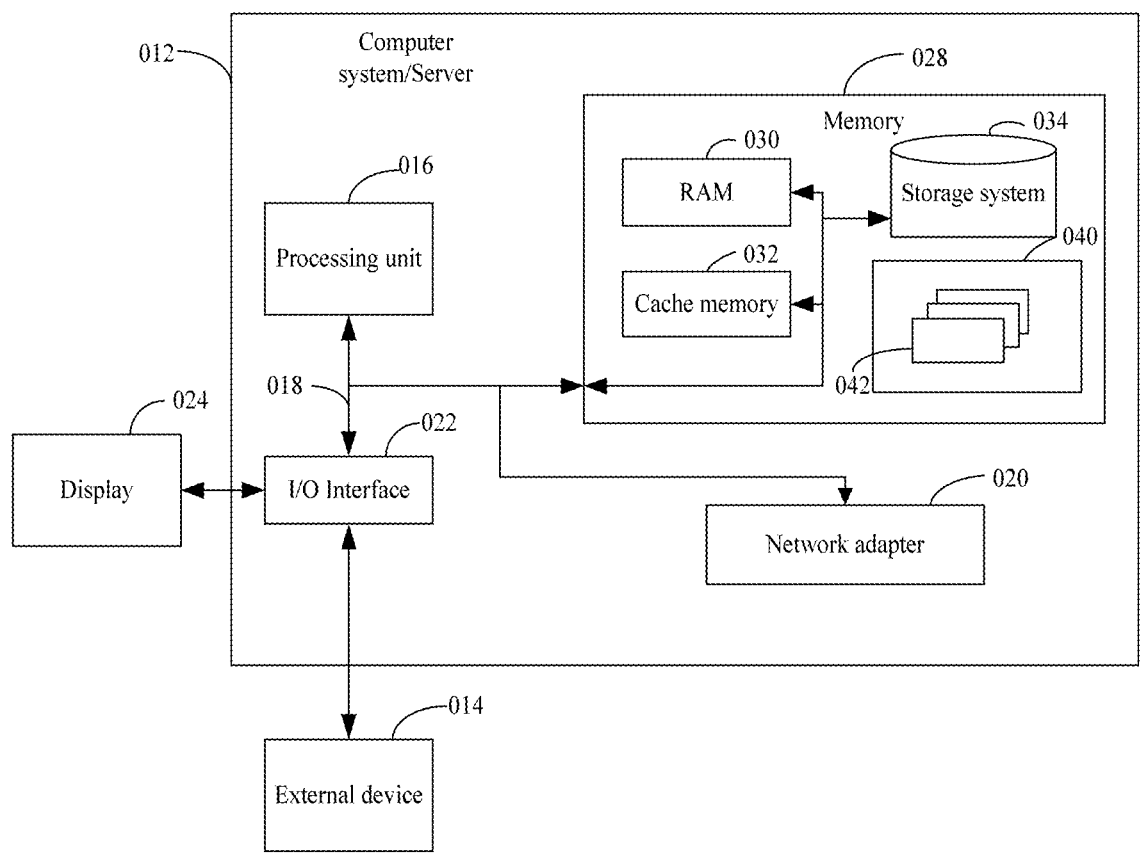
FIG. 3 shows a block diagram of an exemplary computer system/server 012 adapted to implement embodiments of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 102 is shown in the form of a general-purpose computing device. The components of the computer system/server 012 may include, but are not limited to, one or more processors or processing units 016, a memory 028, and a bus 018 that couples various system components including system memory 028 and the processor 016.

The bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system/server 012 readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; in the present disclosure, the computer system/server 012 communicates with an externa radar device, or with one or more devices that enable a user to interact with computer system/server 012, and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown in FIG. 3, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 performs functions and/methods in the embodiments of the present disclosure by running programs stored in the system memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art may clearly understand that reference may be made to the corresponding process in the above method embodiment for the specific operating process of the described system, apparatus and unit, which will not be detailed any more here for the sake of ease and brevity of depictions.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units, and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A speech skill creating method, wherein the method comprises the following steps:
   providing a speech skill creating interface in response to a speech skill creating instruction of a developer;
   obtaining basic information and content configuration of the speech skill through the speech skill creating interface;
   in response to an online publication instruction of the developer, adding a corresponding speech interaction capability for the basic information and content configuration of the speech skill, and creating and publishing the speech skill,
   wherein the providing a speech skill creating interface in response to the speech skill creating instruction of the developer comprises:
      providing a speech skill type selection interface in response to the speech skill creating instruction of the developer; and
      in response to the speech skill type selected by the developer, providing a speech skill creating interface of the speech skill type, wherein the skill type includes any one of the following: conversation speech skill, image speech skill, and audio speech skill, wherein the adding a corresponding speech interaction capability for the basic information and content configuration of the speech skill comprises:

according to the obtained basic information and content configuration of the speech skill, adding a basic intent, monitoring activation and deactivation, exit of the skill, and online presentation capability to the conversation speech skill; or adding a basic intent, a search intent, automatic play, a skill exit capability, and an online presentation capability to the image speech skill; or adding a basic intent, a search intent, automatic play, exit of the skill, and an online presentation capability to the audio speech skill.

2. The method according to claim 1, wherein the speech skill creating interface comprises:

a basic information page configured to obtain the basic information of the speech skill;

a content management page configured to obtain the content configuration of the speech skill;

an online publication page configured to obtain an online publication instruction of the publisher.

3. The method according to claim 1, wherein the basic information of the speech skill includes:

a skill name, a call name and skill payment information.

4. The method according to claim 1, wherein the content configuration of the speech skill includes:

conversation content and play mode of the conversation speech skill; or, image content and play mode of the image speech skill; or, audio content and play mode of the audio speech skill.

5. A computer device, comprising a memory, a processor and a computer program which is stored on the memory and runnable on the processor, wherein the processor, upon executing the program, implements a speech skill creating method, wherein the method comprises the following steps:

providing a speech skill creating interface in response to a speech skill creating instruction of a developer;

obtaining basic information and content configuration of the speech skill through the speech skill creating interface;

in response to an online publication instruction of the developer adding a corresponding speech interaction capability for the basic information and content configuration of the speech skill, and creating and publishing the speech skill, wherein the providing a speech skill creating interface in response to the speech skill creating instruction of the developer comprises:

providing a speech skill type selection interface in response to the speech skill creating instruction of the developer; and in response to the speech skill type selected by the developer, providing a speech skill creating interface of the speech skill type, wherein the skill type includes any one of the following: conversation speech skill, image speech skill, and audio speech skill, wherein the adding a corresponding speech interaction capability for the basic information and content configuration of the speech skill comprises:

according to the obtained basic information and content configuration of the speech skill, adding a basic intent, monitoring activation and deactivation, exit of the skill, and online presentation capability to the conversation speech skill; or adding a basic intent, a search intent, automatic play, a skill exit capability, and an online presentation capability to the image speech skill; or adding a basic intent, a search intent, automatic play, exit of the skill, and an online presentation capability to the audio speech skill.

6. The computer device according to claim 5, wherein the speech skill creating interface comprises:

a basic information page configured to obtain the basic information of the speech skill;

a content management page configured to obtain the content configuration of the speech skill;

an online publication page configured to obtain an online publication instruction of the publisher.

7. The computer device according to claim 5, wherein the basic information of the speech skill includes:

a skill name, a call name and skill payment information.

8. The computer device according to claim 5, wherein the content configuration of the speech skill includes:

conversation content and play mode of the conversation speech skill; or, image content and play mode of the image speech skill; or, audio content and play mode of the audio speech skill.

9. A non-transitory computer-readable storage medium on which a computer program is stored, wherein the program, when executed by a processor, implements a speech skill creating method, wherein the method comprises the following steps:

providing a speech skill creating interface in response to a speech skill creating instruction of a developer;

obtaining basic information and content configuration of the speech skill through the speech skill creating interface;

in response to an online publication instruction of the developer, adding a corresponding speech interaction capability for the basic information and content configuration of the speech skill, and creating and publishing the speech skill, wherein the providing a speech skill creating interface in response to the speech skill creating instruction of the developer comprises:

providing a speech skill type selection interface in response to the speech skill creating instruction of the developer; and in response to the speech skill type selected by the developer, providing a speech skill creating interface of the speech skill type, wherein the skill type includes any one of the following: conversation speech skill, image speech skill, and audio speech skill, wherein the adding a corresponding speech interaction capability for the basic information and content configuration of the speech skill comprises:

according to the obtained basic information and content configuration of the speech skill, adding a basic intent, monitoring activation and deactivation, exit of the skill, and online presentation capability to the conversation speech skill; or adding a basic intent, a search intent, automatic play, a skill exit capability, and an online presentation capability to the image speech skill; or adding a basic intent, a search intent, automatic play, exit of the skill, and an online presentation capability to the audio speech skill.

10. The nontransitory computer-readable storage medium according to claim 9, wherein the speech skill creating interface comprises:

a basic information page configured to obtain the basic information of the speech skill;

a content management page configured to obtain the content configuration of the speech skill;

an online publication page configured to obtain an online publication instruction of the publisher.

11. The nontransitory computer-readable storage medium according to claim 9, wherein the basic information of the speech skill includes:

a skill name, a call name and skill payment information.

12. The non-transitory computer-readable storage medium according to claim 9, wherein the content configuration of the speech skill includes:

conversation content and play mode of the conversation speech skill; or, image content and play mode of the image speech skill; or, audio content and play mode of the audio speech skill.

* * * * *